(12) United States Patent
Sprague

(10) Patent No.: US 7,134,524 B2
(45) Date of Patent: Nov. 14, 2006

(54) METHODS AND APPARATUS FOR THREADABLY COUPLING A HOOK TO A STRUCTURE

(76) Inventor: Theodore Sprague, R.R. #1, Box 146A, New Canton, IL (US) 62356

( * ) Notice: Subject to any disclaimer, the term of this patent is extended or adjusted under 35 U.S.C. 154(b) by 416 days.

(21) Appl. No.: 10/253,789

(22) Filed: Sep. 24, 2002

(65) Prior Publication Data

US 2004/0064932 A1   Apr. 8, 2004

(51) Int. Cl.
*E04G 3/00*   (2006.01)
(52) U.S. Cl. .......................................... 182/92; 182/90
(58) Field of Classification Search ................. 182/92, 182/90, 91, 133, 136, 134; 81/119, 125, 81/488
See application file for complete search history.

(56) References Cited

U.S. PATENT DOCUMENTS

| | | | |
|---|---|---|---|
| 3,298,459 A | 1/1967 | Bergsten | |
| 4,275,621 A | 6/1981 | Mallott, Sr. | |
| 4,413,706 A * | 11/1983 | Michael | 182/91 |
| 4,415,061 A * | 11/1983 | Meyer | 182/92 |
| 4,449,612 A * | 5/1984 | Southard | 182/92 |
| 4,509,393 A | 4/1985 | Castiglione | |
| 4,689,881 A | 9/1987 | Fall | |
| 4,775,030 A * | 10/1988 | Wright | 182/92 |
| 5,335,569 A | 8/1994 | Rowley | |
| 5,624,007 A * | 4/1997 | Mahaffy | 182/92 |
| 5,743,353 A * | 4/1998 | Browning et al. | 182/92 |
| 5,791,208 A | 8/1998 | Grubbs | |
| 5,806,625 A * | 9/1998 | Katz | 182/92 |
| 5,881,837 A * | 3/1999 | Leicht | 182/92 |
| 5,887,677 A * | 3/1999 | Malmgren | 182/92 |
| 5,899,124 A | 5/1999 | Cross, Jr. | |
| 5,941,485 A * | 8/1999 | Davidson et al. | 248/218.4 |
| 5,944,139 A | 8/1999 | Kozial | |
| 5,967,475 A * | 10/1999 | Johnson | 248/217.4 |
| 6,101,905 A | 8/2000 | Hu | |
| 6,230,592 B1 | 5/2001 | Hsiao | |
| 6,439,343 B1 * | 8/2002 | Jorges et al. | 182/92 |
| 2002/0029931 A1 * | 3/2002 | Bridges | 182/92 |

* cited by examiner

*Primary Examiner*—Hugh B. Thompson, II
(74) *Attorney, Agent, or Firm*—Armstrong Teasdale LLP

(57) ABSTRACT

A tree-climbing assembly includes at least one tree step and a tool for rotating the tree step relative to a tree such that the tree step is threadingly coupled to the tree. The tree step includes a threaded first portion, a foot peg, and a second portion that extends between the first portion and the foot peg. The tool includes a retaining sub-assembly and a handle that extends outwardly from the retaining sub-assembly. The retaining sub-assembly includes a first retainer and a second retainer. The second retainer is for engaging the tree step second portion during rotation of the tree step, and the tool first retainer is for engaging the tree step threaded first portion during rotation of the tree step such that the tool handle is substantially concentrically aligned with respect to the tree step first portion.

42 Claims, 3 Drawing Sheets

METHODS AND APPARATUS FOR THREADABLY COUPLING A HOOK TO A STRUCTURE

BACKGROUND OF THE INVENTION

This application relates generally to hooks and, more particularly, to methods and apparatus for threadably coupling a hook to a structure.

During hunting season, hunters attempt to gain certain advantages over their prey, as well as other hunters hunting the same prey. For example, certain advantages may be gained to a bow hunter that is perched well above the ground in comparison to a bow hunter perched in a ground-based location. More specifically, because of natural obstructions near the ground, target angles may be more advantageous when the hunter is elevated. Furthermore, being elevated also facilitates avoiding early detection of the hunter by prey on the ground.

For at least these reasons, it is common for such hunters to hunt from tree stands that are secured within trees at various heights above the ground. To facilitate providing an efficient means for climbing to the tree stands, at least some hunters use a self-tapping hook, commonly referred to as a tree step. At least some known tree steps are characterized by a threaded first portion, and a foot peg portion, and a second portion that extends between the first portion and the foot peg portion. More specifically, the threaded first portion and the foot peg portion are generally horizontal and extend in opposite directions from the generally vertical second portion.

Each tree step is threadably coupled to a structure by screwing the threaded first portion into the structure. More specifically, because the foot peg is offset from the axis of rotation that extends through the first portion, the foot peg portion functions as a handle for the user and enables rotational force to be induced through the threaded first portion to facilitate threadably coupling the tree step to the structure. However, depending upon the density of the material into which the tree step is being coupled, a great amount of rotational force may need to be generated to threadably couple the tree step to the tree.

To facilitate generating additional torque for installing the tree step, a driving tool may be coupled to the tree step prior to the step being coupled to the tree. Known driving tools couple to the foot peg and second portions of the hook to enable the user to manually generate additional torsional forces for coupling the steps to the tree. Other known driving tools include a head member that enables a wrench to be coupled to an end of the driving tool to facilitate generating additional rotational forces for coupling the steps to the tree. However, installing tree steps using such driving tools may still be a time-consuming and laborious task, as each tree step must be initially coupled to the driving tool, and then manually removed from the tree step, to enable the process to be repeated with another tree step.

BRIEF SUMMARY OF THE INVENTION

In one aspect of the invention, an apparatus for coupling a hook to a structure is provided. The hook includes a threaded first portion, and a second portion that extends the first portion to a third portion. The apparatus includes a first end, a second end, and a body that extends longitudinally therebetween. The apparatus first end includes a retaining assembly including a first retainer and a second retainer. The second retainer is for engaging at least a portion of the hook second portion, and the apparatus first retainer is for engaging at least a portion of the hook first portion such that the apparatus body is substantially parallel to the hook first portion.

In another aspect, a tool for rotating a hook relative to a structure is provided. The hook has a threaded first portion and a second portion that extends from the threaded first portion to a third portion. The tool includes a retaining assembly and a handle that extends outwardly from the retaining assembly. The retaining assembly includes a first retainer and a second retainer. The second retainer is for engaging the hook second portion during rotation of the hook, and the first retainer is for engaging the hook threaded first portion during rotation of the hook such that the handle is substantially concentrically aligned with respect to the hook first portion.

In a further aspect of the invention, a tree-climbing assembly is provided. The assembly includes at least one tree step and a tool for rotating the tree step relative to a tree such that the tree step is threadingly coupled to the tree. The tree step includes a threaded first portion, a foot peg, and a second portion that extends between the first portion and the foot peg. The tool includes a retaining sub-assembly and a handle that extends outwardly from the retaining sub-assembly. The retaining sub-assembly includes a first retainer and a second retainer. The second retainer is for engaging the tree step second portion during rotation of the tree step, and the tool first retainer is for engaging the tree step threaded first portion during rotation of the tree step such that the tool handle is substantially concentrically aligned with respect to the tree step first portion.

In yet another aspect, a method for threadably coupling a tree step to a structure is provided. The tree step includes a threaded first portion, a foot peg, and a second portion extending therebetween. The tool includes a retaining sub-assembly and an integrally formed handle that extends from the retaining sub-assembly. The method comprises coupling a tool to the tree step such that the tree step first portion is within a retaining sub-assembly first retainer extending from the tool, the tree step second portion is within a retaining sub-assembly second retainer extending from the tool, and the tool handle is substantially concentrically aligned with respect to the tree step first portion, positioning the tree step adjacent the structure, and rotating the tree step with the tool such that the tree step until the tree step is threadably coupled to the structure.

In another aspect of the invention, a method for threadably coupling a hook to a structure is provided. The method comprises providing a tool including a retaining assembly and an integrally-formed handle extending from the retaining assembly, wherein the retaining assembly includes a first retainer and a second retainer, and coupling the tool to the hook such that a first threaded portion of the hook is positioned within the tool first retainer, and such that a second portion of the hook that extends from the hook first portion to a hook third portion is positioned within the tool second retainer. The method also comprises positioning a tip of the hook first portion adjacent the structure, and rotating the tool to enable the hook to threadably couple to the structure.

DETAILED DESCRIPTION OF THE INVENTION

Figure 1:
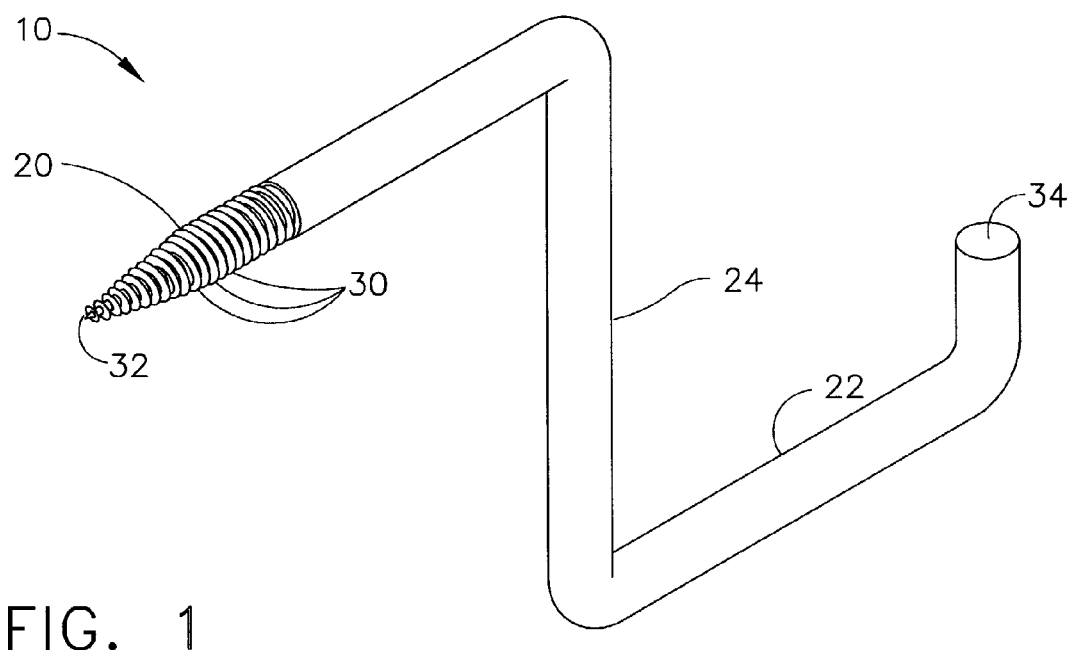
FIG. 1 is perspective view of a known hook.
Figure 2:
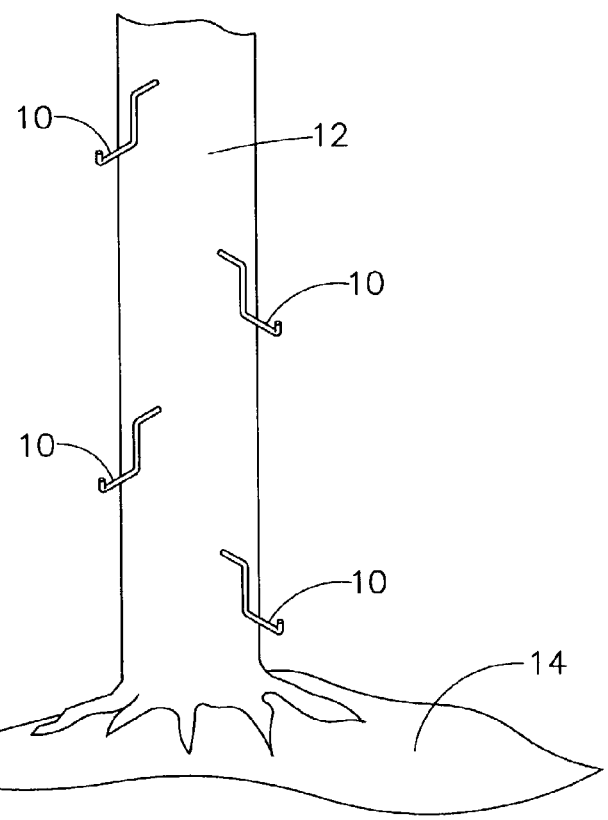
FIG. 2 is a perspective view of a plurality of the hooks shown in FIG. 1 and threadably coupled to a structure.

FIG. 1 is perspective view of a known hook 10. FIG. 2 is a perspective view of a plurality of hooks 10 threadably coupled to a structure 12. In the exemplary embodiment shown in FIG. 2, structure 12 is a tree, and hooks 10 are known as tree steps, and are used to facilitate a user climbing to an elevated height above ground 14. In one embodiment, hooks 10 are Model #104 tree steps commercially available from Ameristep, Inc., Clio, Mich. In an alternative embodiment, structure 12 is a wall and hooks 10 are used to store goods in a hanging posture against the wall.

Hooks 10 includes a coupling portion 20, a foot peg or hanging portion 22, and an intermediate portion 24 that extends therebetween such that a first elbow is defined between portions 20 and 24, and a second elbow is defined between portions 22 and 24. In one embodiment, portions 20 and 22 are substantially parallel and both extend substantially perpendicularly from intermediate portion 24. In an alternative embodiment, intermediate portion 24 extends obliquely between portions 22 and 24. In a further embodiment, portions 20, 22, and 24 define a substantially Z-shaped cross-sectional profile for hook 10.

Coupling portion 20 is elongate and includes a plurality of threads 30 that extend aftward towards intermediate portion 24 from a self-tapping tip 32. In the exemplary embodiment, coupling portion 20, intermediate portion 22, and foot peg portion 24 each have a substantially circular cross-sectional profile. Foot peg portion 22 is elongate and includes a curved outer end 34 that facilitates preventing an object, such as a users foot, from slipping outwardly away from and/or off intermediate portion 24.

During use, when hooks 10 are fully coupled to structure 12, hook first portion 20 and foot peg portion 24 are generally parallel and horizontal, and intermediate portion 22 is generally vertical. More specifically, when coupled to structure 12, hook first portion 20 is threadably coupled to structure 12 such that a majority of hook first portion 20 is within structure 12 and foot peg portion 24 extends outwardly from structure 12.

Figure 3:
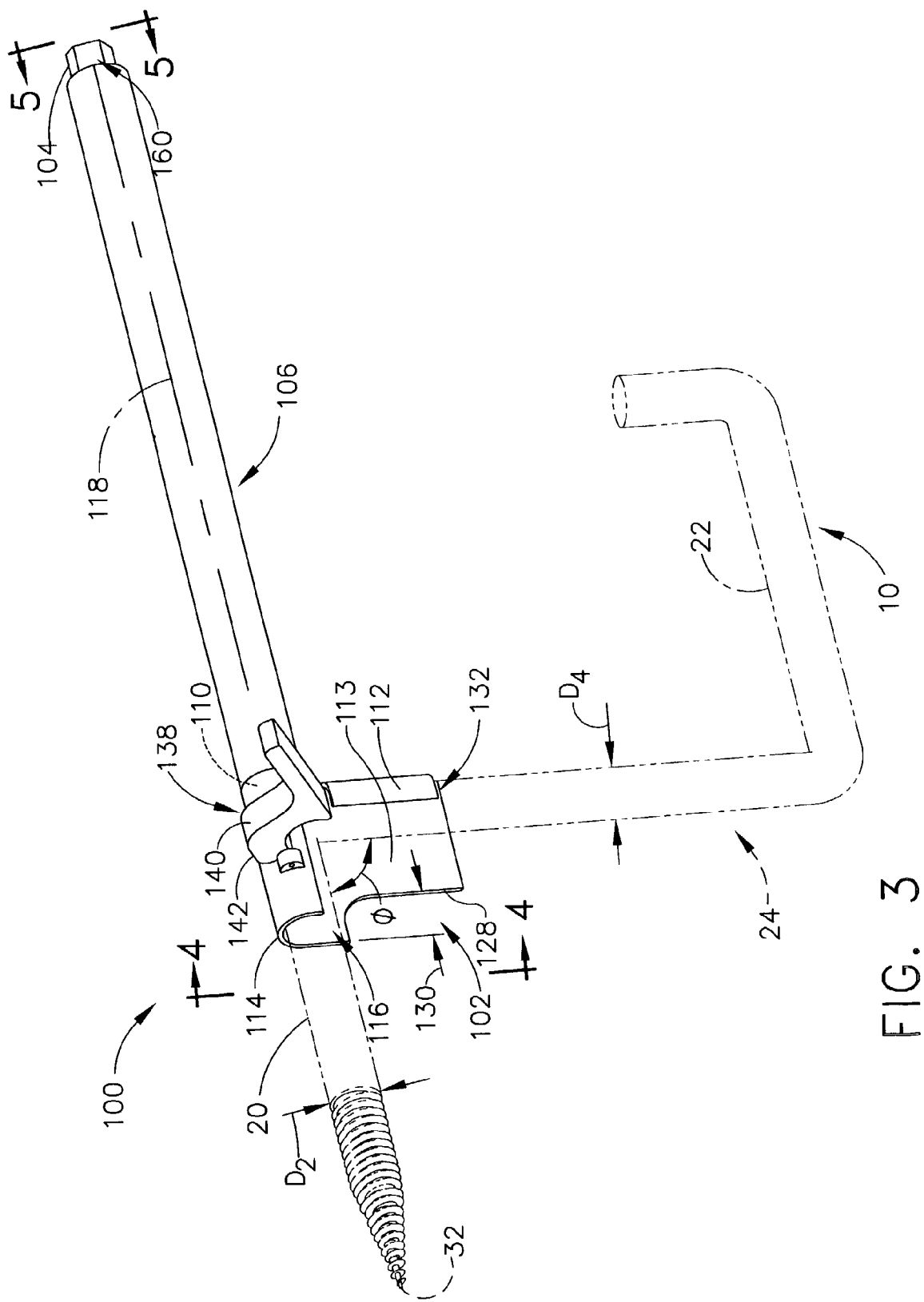
FIG. 3 is a side view of an apparatus for threadably coupling hooks, such as the hook shown in FIG. 1, to a structure.
Figure 4:
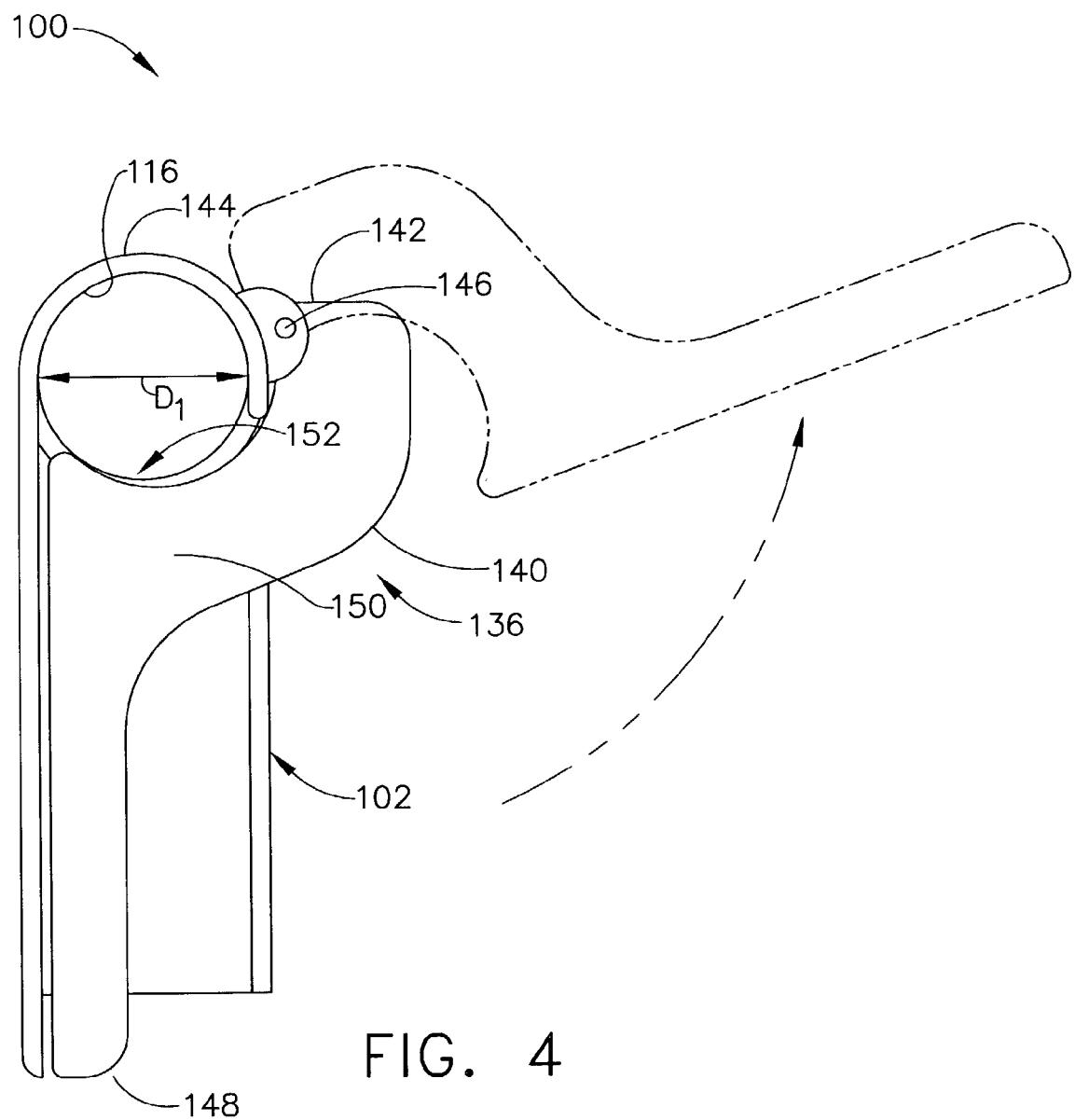
FIG. 4 is an end view of the apparatus shown in FIG. 3 taken along line 4—4.
Figure 5:
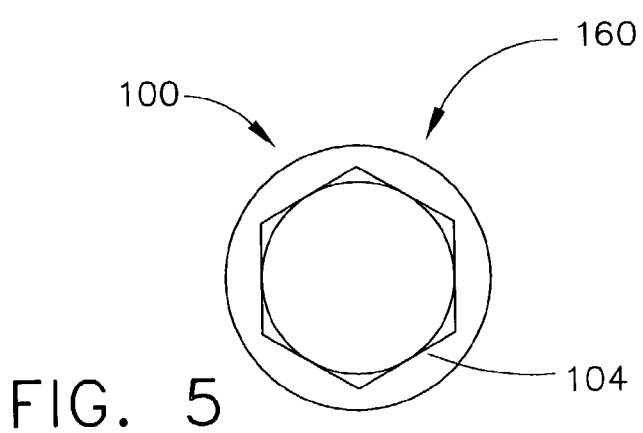
FIG. 5 is an end view of the apparatus shown in FIG. 3 taken along line 5—5.

FIG. 3 is a side view of an apparatus 100 used to threadably couple a hook, such as hook 10, to a structure, such as structure 12 (shown in FIG. 2). FIG. 4 is an end view of apparatus 100 taken along line 4–4. FIG. 5 is an end view of apparatus 100 taken along line 5–5. Apparatus 100 includes a retaining assembly 102, a head member 104, and an elongate body 106 extending therebetween. More specifically, body 106 forms a handle that extends outwardly from retaining assembly 102. In the exemplary embodiment, body 106 is formed integrally with retaining assembly 102 and head member 104.

Retaining assembly 102 includes a first retainer 110 and a second retainer 112 coupled together by a substantially planar flange 113. First retainer 110 extends from an end 114 of apparatus 100 towards head member 104, and defines a substantially u-shaped channel 116 therein. Channel 116 is oriented substantially parallel to a centerline axis of symmetry 118 extending through body 106. In the exemplary embodiment, channel 116 is substantially semi-circular shaped and has a diameter $d_1$ that is larger than an outer diameter $d_2$ of hook threaded first portion 20. Accordingly, first retainer 110 is sized to receive a portion of hook threaded first portion 20 therein. In an alternative embodiment channel 116 has a non-semi-circular cross-sectional profile.

Retaining assembly flange 113 extends between retainer 110 and retainer 112, and is a positioned such that an outer edge 128 of flange 113 is recessed a distance 130 from apparatus end 114. Second retainer 112 is formed integrally with flange 113 and defines a substantially unshaped channel 132 therein. An orientation of channel 132 is variably selected depending on an angle of orientation of hook intermediate member 24 with respect to hook first portion 20. In the exemplary embodiment, channel 132 is oriented substantially perpendicularly with respect to body centerline axis of symmetry 118. In the exemplary embodiment, channel 132 is substantially semi-circular shaped and has a diameter (not shown) that is larger than an outer diameter $d_4$ of hook threaded intermediate portion 24. Accordingly, second retainer 113 is sized to receive a portion of hook threaded first portion 20 therein. In an alternative embodiment, channel 132 has a non-semi-circular cross-sectional profile.

Retaining assembly 102 also includes a locking mechanism 140 that is rotatably coupled to retainer 110 for rotating between a closed position 136 (shown in FIG. 4) and an open position 138 (shown in FIG. 3). More specifically, locking mechanism 140 includes a first end 142 rotatably coupled to an external surface 144 of retainer 110 by a hinge pin 146, a second end 148, and a body 150 extending therebetween. Locking mechanism body 146 is contoured such that a recess 152 is defined between ends 142 and 146. Recess 152 is contoured to enable locking mechanism body 150 to substantially match a contour of hook first portion 20. Accordingly, when locking mechanism 140 is rotated to closed position 136, recess 152 mates against hook first portion 20 such that recess 148 is substantially flush against hook first portion 20. Furthermore, when in closed position 136, locking mechanism 140 is frictionally coupled against flange outer edge 128.

Apparatus head member 104 forms an opposite end 160 of apparatus 100 and enables apparatus 100 to be coupled to a rotary device (not shown) for coupling hooks 10 to structure 12 (shown in FIG. 2). In one embodiment, the rotary device is a powered tool, such as, but not limited to a battery powered drill or an electric drill. In the exemplary embodiment, head member 104 is shaped to form a drill bit fitting adapter. More specifically, head member 104 has a substantially octagonal cross-sectional profile. In an alternative embodiment, head member 104 may have a non-octagonal cross-sectional profile, such as, but not limited to a substantially circular cross-sectional profile, a substantially square cross-sectional profile, or a substantially hexagonal cross-sectional profile. In a further embodiment, head member 104 is not received within a rotary device, but rather, head member 104 defines a cavity therein that is sized to receive a portion of a rotary device therein.

During use, apparatus 100 is initially coupled to hook 10 such that hook 10 is retained within apparatus retainer assembly 102. More specifically, when hook 10 is retainer within apparatus 100, a portion of hook first portion 20 is received within apparatus first retainer 110, and a portion of hook intermediate portion 24 is received within apparatus second retainer 112. Furthermore, when coupled within apparatus 100, apparatus body 106 is substantially concentrically aligned with respect to hook first portion 20. Locking mechanism 140 is then rotated to closed position 136 wherein the frictional contact between mechanism 140 and retaining assembly flange outer edge 128 facilitates maintaining hook 10 within apparatus 100 during installation of hook 10 to structure 12.

Apparatus head member 104 is then coupled to a powered rotary device, and hook self-tapping tip 32 is positioned adjacent structure 12. When the powered rotary device is energized, head member 104 enables apparatus 100 to simultaneously rotate about body centerline axis of symmetry 118, which in turn causes subsequent and simultaneous rotation of hook 10 about centerline axis of symmetry 118.

Locking mechanism 140 coupling between apparatus 100 and hook 10 until hook 10 is fully threadably coupled to structure 12. More specifically, when hook 10 is fully threadably coupled to structure 12, locking mechanism 140 any additional rotation of apparatus 100 causes rotation of locking mechanism 140 from closed position 136 to open position 138 such that apparatus 100 is automatically uncoupled from hook 10, and hook 10 is released from apparatus 100.

The above-described apparatus is cost-effective and highly reliable. The apparatus enables a hook to be threadably coupled to a structure using a powered rotary device. More specifically, the apparatus includes a retainer assembly that only engages the threaded and intermediate portions of the hook. Because the locking mechanism is uncoupled automatically once the hook is fully threadably coupled, repeating the process with additional hooks is an efficient and quick operation. As a result, the apparatus facilitates threadably coupling a hook to a structure in a cost-effective and reliable manner.

Exemplary embodiments of apparatus for coupling hooks are described above in detail. The tools are not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. Apparatus for coupling a hook to a structure, wherein the hook has a threaded first portion, and a second portion that extends from the first portion to a third portion that extends in an opposite direction than the first portion, said apparatus comprising a first end, a second end, and a body extending longitudinally therebetween and having an axis of symmetry extending between said first end and said second end, wherein rotation of the hook about said axis of symmetry causes the hook to couple to the structure, said apparatus first end comprising a retaining assembly comprising a first retainer and a second retainer, said apparatus second retainer adapted to engage at least a portion of the hook second portion, said apparatus first retainer adapted to engage at least a portion of the hook first portion such that said apparatus body is substantially parallel to the hook first portion.

2. Apparatus in accordance with claim 1 wherein the hook first portion includes a centerline axis of symmetry, said apparatus body is adapted to be substantially co-linear with respect to the hook first portion when said first retainer engages the hook first portion.

3. Apparatus in accordance with claim 1 wherein said apparatus second end comprises a head member configured to couple to a device used to rotate said apparatus for coupling the hook to a structure.

4. Apparatus in accordance with claim 3 wherein said apparatus head member comprises a drill bit adapter.

5. Apparatus in accordance with claim 4 wherein rotation of said head member is adapted to cause rotation of the hook for coupling the hook to a structure.

6. Apparatus in accordance with claim 1 wherein at least one of said retaining assembly first retainer and said second retainer defines a channel therein formed integrally with said apparatus.

7. Apparatus in accordance with claim 1 wherein said retaining assembly formed integrally with said apparatus.

8. Apparatus in accordance with claim 1 further comprising a locking mechanism configured to retain a portion of the hook within at least one of said first retainer and said second retainer during rotation of the apparatus to couple the hook to the structure.

9. Apparatus in accordance with claim 8 wherein said locking mechanism pivotally coupled to said apparatus.

10. Apparatus in accordance with claim 8 wherein said locking mechanism configured to release the hook when the hook is fully coupled to the structure.

11. A tool for rotating a hook relative to a structure, wherein the hook has a threaded first portion and a second portion extending from the threaded first portion to a third portion that extends from the second portion in an opposite direction than the first portion, said tool comprising a retaining assembly and a handle extending outwardly from said retaining assembly, said retaining assembly comprising a first retainer and a second retainer, said second retainer adapted to engage the hook second portion during rotation of the hook, said first retainer adapted to engage the hook threaded first portion during rotation of the hook such that said handle is substantially concentrically aligned with respect to the hook first portion, and such that said handle has an axis of symmetry extending between a first end and a second end, wherein rotation of the handle about said axis of symmetry causes the hook to couple to the structure.

12. A tool in accordance with claim 11 wherein said retaining assembly further comprises a locking mechanism configured to retain the hook therein during rotation of said tool.

13. A tool in accordance with claim 12 wherein said retaining assembly locking mechanism configured to retain the hook first portion during rotation of said tool.

14. A tool in accordance with claim 12 wherein said retaining locking mechanism is pivotally coupled to said tool.

15. A tool in accordance with claim 12 wherein said retaining locking mechanism further configured to release said tool from the hook when the hook is fully coupled to the structure.

16. A tool in accordance with claim 12 wherein said tool handle comprises a head member for coupling said tool to a mechanical device used to rotate said tool.

17. A tool in accordance with claim 16 wherein said head member comprises a cavity for coupling said tool to a rotary device used to rotate said tool.

18. A tool in accordance with claim 16 wherein said head member has at least one of a substantially circular cross-sectional profile, a substantially hexagonal cross-sectional profile, a substantially octagonal cross-sectional profile, and a substantially square cross-sectional profile.

19. A tool in accordance with claim 16 wherein said tool handle comprises a drill bit adapter for coupling said tool to a rotary device used to rotate said tool.

20. A tool in accordance with claim 12 wherein rotation of said handle is adapted to cause rotation of the hook relative to the structure.

21. A tree-climbing assembly comprising:
at least one tree step comprising a threaded first portion, a foot peg, and a second portion extending therebetween, said foot peg extending in an opposite direction than said first portion; and
a tool for rotating said tree step relative to a tree such that said tree step is threadingly coupled into said tree, said tool comprising a retaining sub-assembly and a handle extending outwardly from said retaining sub-assembly, said retaining sub-assembly comprising a first retainer and a second retainer, said second retainer for engaging said tree step second portion during rotation of said tree step, said tool first retainer for engaging said tree step threaded first portion during rotation of said tree step such that said handle is substantially concentrically aligned with respect to said tree step first portion.

22. A tree-climbing assembly in accordance with claim 21, wherein said tree step threaded first portion comprises a center axis of symmetry extending therethrough, said tool first retainer for engaging said tree step threaded first portion during rotation of said tree step such that said handle is substantially concentrically aligned with respect to said tree step threaded first portion.

23. A tree-climbing assembly in accordance with claim 21 wherein said tool handle is formed integrally with said retaining sub-assembly and comprises a head member for rotatably coupling said tool with a rotary device.

24. A tree-climbing assembly in accordance with claim 22 wherein said head member defines a cavity therein.

25. A tree-climbing assembly in accordance with claim 22 wherein said tool retaining sub-assembly further comprises a locking mechanism pivotally coupled to said tool for retaining said tree step during rotation of said tree step.

26. A tree-climbing assembly in accordance with claim 25 wherein said locking mechanism configured to release said tree step from said tool when said tree step is fully coupled to a structure.

27. A method for threadably coupling a tree step to a structure, wherein the tree step includes a threaded first portion, a foot peg, and a second portion extending therebetween, and wherein the tree step includes a retaining sub-assembly and an integrally formed handle extending from the retaining sub-assembly, said method comprising:
coupling a tool to the tree step such that the tree step first portion is within a retaining sub-assembly first retainer extending from the tool, the tree step second portion is within a retaining sub-assembly second retainer extending from the tool, and the tool handle is substantially concentrically aligned with respect to the tree step first portion;
positioning the tree step adjacent the structure; and
rotating the tree step with the tool such that the tree step until the tree step is threadably coupled to the structure.

28. A method in accordance with claim 27 wherein coupling a tool to the tree step further comprises positioning a locking mechanism to retain the tree step in position with respect to the tool during rotation of the tool and tree step.

29. A method in accordance with claim 28 wherein positioning a locking mechanism further comprises rotating a locking mechanism from an open position to a closed position to retain the tree step within the tool.

30. A method in accordance with claim 28 wherein positioning a locking mechanism further comprises rotating a locking mechanism that is pivotally coupled to the tool in position to retain the tree step.

31. A method in accordance with claim 28 wherein rotating the tree step with the tool further comprises positioning the locking mechanism to automatically release the tool from the tree step when the tree step is coupled to the structure.

32. A method in accordance with claim 27 wherein rotating the tree step with the tool further comprises coupling the tool handle to a rotary device.

33. A method in accordance with claim 32 wherein coupling the tool handle to a rotary device further comprises coupling a head member formed integrally with an end of the handle to the rotary device.

34. A method for threadably coupling a hook to a structure, said method comprising:
providing a tool including a retaining assembly and an integrally-formed handle extending from the retaining assembly, wherein the retaining assembly includes a first retainer and a second retainer, wherein the handle has an axis of symmetry extending between a first end and a second end of the handle;
coupling the tool to the hook such that a first threaded portion of the hook is positioned within the tool first retainer, and such that a second portion of the hook that extends from the hook first portion to a hook third portion is positioned within the tool second retainer;
positioning a tip of the hook first portion adjacent the structure; and
rotating the tool about the axis of symmetry to enable the hook to threadably couple to the structure.

35. A method in accordance with claim 34 further comprising releasing the hook from the tool when the hook is threadably coupled to the structure.

36. A method in accordance with claim 35 wherein coupling the tool to the hook further comprises coupling the tool to the hook such that the tool handle is substantially concentrically aligned with respect to the hook first portion.

37. A method in accordance with claim 35 further comprising coupling the tool to a rotary device for rotating the hook with respect to the structure.

38. A method in accordance with claim 37 wherein coupling the tool to a rotary device further comprises coupling a head member extending from the tool handle to the rotary device.

39. A method in accordance with claim 37 wherein coupling the tool to a rotary device further comprises inserting an end of the tool handle within a mating socket extending from the rotary device.

40. A method in accordance with claim 35 wherein coupling the tool to the hook further comprises positioning a locking mechanism to retain the hook within the tool during rotation of the tool.

41. A method in accordance with claim 40 wherein positioning a locking mechanism to retain the hook further comprises rotating a locking mechanism formed integrally with the tool from an open position to a closed position to retain the hook during rotation of the tool.

42. A method in accordance with claim 40 wherein positioning a locking mechanism to retain the hook further comprises positioning the locking mechanism to automatically release the tool from the hook when the hook is threadably coupled to the structure.

* * * * *